(12) United States Patent
Withers et al.

(10) Patent No.: US 9,150,943 B2
(45) Date of Patent: Oct. 6, 2015

(54) METALLOTHERMIC REDUCTION OF IN-SITU GENERATED TITANIUM CHLORIDE

(75) Inventors: James C. Withers, Tucson, AZ (US);
Raouf O. Loutfy, Tucson, AZ (US)

(73) Assignee: MATERIALS & ELECTROCHEMICAL RESEARCH CORP., Tucson, AZ (US)

( * ) Notice: Subject to any disclaimer, the term of this patent is extended or adjusted under 35 U.S.C. 154(b) by 1834 days.

(21) Appl. No.: 12/016,859

(22) Filed: Jan. 18, 2008

(65) Prior Publication Data
US 2008/0190778 A1 Aug. 14, 2008

Related U.S. Application Data

(60) Provisional application No. 60/886,056, filed on Jan. 22, 2007.

(51) Int. Cl.
C25C 3/00 (2006.01)
C25C 3/26 (2006.01)
(Continued)

(52) U.S. Cl.
CPC ............ *C22B 34/129* (2013.01); *C22B 34/1222* (2013.01); *C22B 34/1272* (2013.01); *C25C 3/00* (2013.01); *C25C 3/26* (2013.01); *C25C 3/28* (2013.01); *C25C 5/04* (2013.01)

(58) Field of Classification Search
CPC .................................... C25C 3/00; C25C 3/26
USPC .................................. 205/366, 334, 397, 542
See application file for complete search history.

(56) References Cited

U.S. PATENT DOCUMENTS 2,302,604 A 11/1942 Dolbear
2,681,847 A 6/1954 Wainer et al.
(Continued)

FOREIGN PATENT DOCUMENTS

CA 626363 8/1961
CH 1376813 10/2002
(Continued)

OTHER PUBLICATIONS

Chinese Office Action + Translation dated Jan. 20, 2011 (9 pages).
(Continued)

*Primary Examiner* — Zulmariam Mendez
(74) *Attorney, Agent, or Firm* — Hayes Soloway P.C.

(57) ABSTRACT

A method for producing a pure metal M or metal alloy $M_xN_y$, of interest, which comprises electrolyzing a molten salt electrolyte of an alkali-metal or alkaline-earth metal halide AX or $AX_2$, with an anode formed of graphite or made of a composite of a metal oxide of the metal of interest and carbon, to discharge the alkali or alkaline-earth metal A, at the cathode, and to discharge nascent chlorine gas at the anode, whereby to produce a halide of the metal of interest $MX_n$ and/or $NX_n$, and metallothermically reducing the metal halide $MX_n$ and/or $NX_n$ either separately or combined, with the alkali or alkaline-earth metal A, obtained cathodically to produce the metal M or the metal alloy $M_xN_y$ of interest in particulate form.

37 Claims, 6 Drawing Sheets

(51) Int. Cl.
*C22B 34/12* (2006.01)
*C25C 3/28* (2006.01)
*C25C 5/04* (2006.01)

(56) References Cited

U.S. PATENT DOCUMENTS

| | | | |
|---|---|---|---|
| 2,681,848 A | 6/1954 | Wainer et al. | |
| 2,681,849 A | 6/1954 | Sibert et al. | |
| 2,698,221 A | 12/1954 | Wainer et al. | |
| 2,707,168 A | 4/1955 | Wainer et al. | |
| 2,722,509 A | 11/1955 | Wainer et al. | |
| 2,733,133 A | 1/1956 | Cave et al. | |
| 2,743,166 A | 4/1956 | Wainer et al. | |
| 2,750,259 A | 6/1956 | Steinberg et al. | |
| 2,792,310 A | 5/1957 | Steinberg et al. | |
| 2,798,844 A | 7/1957 | Freedman | |
| 2,828,251 A | 3/1958 | Sibert et al. | |
| 2,831,802 A | 4/1958 | Raney | |
| 2,833,704 A | 5/1958 | Wainer | |
| 2,848,303 A | 8/1958 | Copper | |
| 2,868,703 A | 1/1959 | Wainer | |
| 2,880,149 A | 3/1959 | Carlton et al. | |
| 2,904,426 A | 9/1959 | Wainer | |
| 2,904,428 A | 9/1959 | Dean | |
| 2,909,473 A | 10/1959 | Dean et al. | |
| 2,913,379 A | 11/1959 | Steinberg | |
| 2,917,440 A | 12/1959 | Olson | |
| 2,939,823 A | 6/1960 | Rand | |
| 2,994,650 A | 8/1961 | Slatin | |
| 3,047,477 A | 7/1962 | Spraul et al. | |
| 3,078,149 A | 2/1963 | Barber | |
| 3,083,153 A | 3/1963 | Wagner | |
| 3,098,805 A * | 7/1963 | Ervin, Jr. et al. | 205/397 |
| 3,137,641 A | 6/1964 | Slatin | |
| 3,794,482 A | 2/1974 | Anderson et al. | |
| 3,825,415 A | 7/1974 | Johnston et al. | |
| 3,853,536 A | 12/1974 | Tylko | |
| 3,915,837 A | 10/1975 | Feige, Jr. | |
| 3,941,583 A | 3/1976 | Martin et al. | |
| 3,989,511 A | 11/1976 | Fey et al. | |
| 4,080,194 A | 3/1978 | Fey | |
| 4,107,445 A | 8/1978 | Wolf et al. | |
| 4,127,409 A | 11/1978 | Megy | |
| 4,338,177 A | 7/1982 | Withers et al. | |
| 4,342,637 A | 8/1982 | Withers et al. | |
| 4,373,947 A | 2/1983 | Buttner et al. | |
| 4,409,083 A | 10/1983 | Upperman et al. | |
| 4,431,503 A | 2/1984 | Withers et al. | |
| 4,668,501 A | 5/1987 | Shibuta et al. | |
| 4,670,110 A | 6/1987 | Withers et al. | |
| 4,923,577 A * | 5/1990 | McLaughlin et al. | 205/397 |
| 4,931,213 A | 6/1990 | Cass | |
| 5,215,631 A | 6/1993 | Westfall | |
| 5,224,534 A | 7/1993 | Shimizu et al. | |
| 5,772,724 A | 6/1998 | Inoue et al. | |
| 6,231,636 B1 | 5/2001 | Froes et al. | |
| 7,410,562 B2 | 8/2008 | Withers et al. | C25C 3/00 |
| 7,648,560 B2 | 1/2010 | Ogasawara et al. | 75/617 |
| 2003/0057101 A1 | 3/2003 | Ward Close et al. | |
| 2004/0194574 A1 | 10/2004 | Cardarelli | |
| 2005/0000819 A1 | 1/2005 | LeGeros et al. | 205/104 |
| 2005/0034561 A1 | 2/2005 | Liebaert | |
| 2005/0166706 A1* | 8/2005 | Withers et al. | 75/10.23 |
| 2006/0120943 A1 | 6/2006 | Lee et al. | 423/440 |
| 2006/0236811 A1 | 10/2006 | Withers et al. | 75/10.23 |
| 2007/0181435 A1 | 8/2007 | Ogasawara et al. | 205/366 |

FOREIGN PATENT DOCUMENTS

| | | | |
|---|---|---|---|
| CN | 1376813 A | 10/2002 | |
| CN | 1712571 | 12/2005 | |
| CN | 1867702 A | 11/2006 | C25C 5/04 |
| EP | 1683877 | 7/2006 | C22B 34/12 |
| FR | 1.167.261 | 11/1958 | |
| GB | 251527 | 6/1926 | |
| GB | 452269 | 3/1936 | |
| GB | 635267 | 4/1950 | |
| GB | 825872 | 12/1959 | |
| JP | 2000-86225 | 3/2000 | |
| JP | 2005/133195 | 5/2005 | |
| JP | 2005-264320 | 9/2005 | |
| WO | WO 99/64638 | 12/1999 | |
| WO | WO 02/066711 | 8/2002 | |
| WO | WO 02/083993 | 10/2002 | |
| WO | WO 03/046258 | 5/2003 | |
| WO | WO 03/002785 | 9/2003 | |
| WO | WO2006/040978 | 4/2006 | C25C 3/28 |

OTHER PUBLICATIONS

Hashimoto, "Sintered Titanium Carbide as the Soluble Anode for Fused-Salt Electrolysis", Dep.Mater. Sci., Himeji Inst. Technol., Himeji, Journal, 1971, pp. 487-493, Abstract.

Hasimoto, "Extraction of titanium from soluble anodes of arc-reduced titanium—carbon—oxygen and titanium carbide", Dep. Mater.Sci.,Himeji Inst.Technol., 1971, pp. 282-288.

Hashimoto, "Anodic extraction of titanium from low-grade(s)—titanium—carbon—oxygen alloy by fused-salt electrolysis", Dep. MaterSci.Himeji Inst.,Himeji,1971 pp. 480-486.

Hashimoto, "Electrodeposition of pure titanium metal by double-stage fused-salt electrolysis", Dep.Mater.Sci.Himeji Inst., Journal, 1968, pp. 108-119.

Hashimoto, "Electrowinning of titanium from its oxides. III. Electrowinning of titanium from titanium dioxide . . . ", Dep. Mater. Sci, 1972, pp. 39, abstract.

ASM International, Materials Park, Ohio, Powder Metal Technologies an Applications, vol. 7, "Production Sintering Practices", pp. 499-501. 1998.

Ananth et al., "Single Step Electrolytic Production of Titanium", Trans. Indian Inst. Met., vol. 51, No. 5, Oct. 1998, pp. 339-403.

Kiparisov et al., "Obtaining of Titanium Powder by Ore Concentrates Treatment", Science of Sintering, vol. 17, No. 3; Sep. 1985; pp. 139-144.

Hashimoto, Yasuhiko, "Studies of Electrowinning of Titanium from Titanium Oxides in CAF3-MgF2 Molten Salt Baths", Hashimoto Journal, 40, No. 1, 1872, pp. 1-13.

Jiao et al., "Titanium electrolysis using TiCxOy anode prepared through carbothermic reduction of titanium . . .", School of Metallurgical/Ecological Engr, Beijing, pp. 867-869.

"Direct Electrochemical Reduction of Titanium Dioxide to Titanium in Molten Calcium Chloride" Chen et al., Letters to Nature, vol. 407, 2000, pp. 361-364.

"The Fusion Electrolysis of Titanium, Sixth Castner Memorial Lecture" Kroll, Chemistry and Industry, 1960, pp. 1314-1322.

"The Production of Ductile Titanium" Kroll, Paper presented and the Seventy-Eighth General Meeting, 1940, pp. 35-47.

"Metallic Titanium" Hunter, General, Physical and Inorganic, pp. 330-338.

"Why Produce Titanium by EW?" Ginatta, Industrial Insight, 2000, pp. 18-20.

"Some Observations on the Kroll Process for Titanium" Wartman et al., Journal of the Electrochemical Society, 1954, pp. 507-513.

"Sodium Reduction of Titanic Chloride" Homme et al., Report of Investigations 5398, 1958, pp. 1-29.

"Mechanism of Sodium Reduction of Titanium Chloride in Fused Salts" Henri et al., Report of Investigations 5661, pp. 1-37.

Yasuhiko Ito, Toshiyuki Nohira, "Non-conventional electrolytes for . . . ", Electrochimica Acta, Elsevier Science Publishers, Barking, GB, vol. 45, No. 15, May 2000, pp. 2612-2622.

A. Robin & R.B. Ribeiro, "Pulse electrodeposition of titanium on carbon steel in the LiF—NaF—KF eutectic melt", J. Applied Electrochemistry, vol. 30, 2000, pp. 239-246.

Deura et al., "Titanium Powder Production by TiCl4 Gas Injection into Magnesium through Molten Salts", Metallurgical and Materials Transactions B, vol. 29B, Dec. 1998, pp. 1167-1174.

Suzuki et al., "Titanium Powder Prepared by Magnesiothermic Reduction of Ti2+ in Molten Salt", Metallurgical and Materials Transactions B, vol. 30B, Jun. 1999, pp. 403-410.

(56) References Cited

OTHER PUBLICATIONS

Fuwa et al., "Producing Titanium by Reducing TiCl2—MgCl2 Mixed Salt with Magnesium in the Molten State", JOM, Oct. 2005, pp. 56-60.
Chinese Office Action dated Aug. 11, 2010 (6 pages) with English translation (6 pages).
European Search Report issued in EP 08 72 7959 dated Jun. 6, 2011 (5 pgs).
Chinese Office Action and translation, Appln. No. 200880002798.6, Aug. 10, 2011 (7 pgs).
Australian Examination Report dated Dec. 21, 2011 issued in Appln. No. 2008208040 (2 pgs).
Japanese Office Action and translation, Appln. No. 2009-546555 dated Sep. 20, 2012 (4 pgs).
European Official Action dated. Nov. 23, 2012 (4 pages).
Canadian Office Action issued in related application No. 2,676,247, dated Oct. 2, 2013 (2 pgs).
Korean Official Action issued in related application No. 10-2009-7017549, dated Aug. 14, 2014 (6 pgs).
European Office Action issued in application No. 08 727 959.2, dated Jan. 24, 2012 (3 pgs).

\* cited by examiner

Figure 1: Prior Art

METALLOTHERMIC REDUCTION OF IN-SITU GENERATED TITANIUM CHLORIDE

CROSS-REFERENCE TO RELATED APPLICATIONS

This application claims priority from U.S. Provisional Application Ser. No. 60/886,056, filed Jan. 22, 2007.

BACKGROUND OF THE INVENTION

This invention relates to the production of metals. The invention has particular utility in connection with the production of titanium and alloys of titanium and will be described in connection with such utility, although other utilities are contemplated.

BRIEF DESCRIPTION OF THE PRIOR ART

The inherent properties of titanium consisting of lightweight, high corrosion resistance, high strength when alloyed and moderate stiffness makes it the metal of choice for many applications. Being over 40% lighter than steel and exhibiting high corrosion resistance makes titanium a desirable substitute for steel. However, titanium's high cost limits its applications in many sectors for defense, transportation and corrosion resistant applications. The first commercial process of producing titanium metal involved sodium reduction of titanium tetrachloride as demonstrated by Professor Hunter in 1910 at the Rensselaer Polytechnic Institute—The Hunter Process. Later in 1932 Kroll produced titanium by the magnesium reduction of titanium tetrachloride—The Kroll Process which was subsequently commercialized in the United States. Today, titanium throughout the world is produced by the Kroll process in preference to the Hunter process. In the commercial practice of the Kroll process, liquid magnesium is contained in a steel retort in the absence of air held at approximately 900° C. with titanium tetrachloride mixed from the top into the liquid magnesium which produces titanium metal and magnesium chloride according to the following reaction:

$$2Mg+TiCl_4=Ti+2MgCl_2 \qquad (1)$$

The $MgCl_2$ is removed from the retort and electrolyzed in a separate cell to produce the magnesium for reducing the titanium tetrachloride. A schematic of the overall Kroll process is shown in FIG. 1. A disadvantage of both the Hunter and Kroll processes are they are carried out in batch which contributes to the high cost of titanium. Also, a sponge mass is produced which is not directly usable, but must be melted to purify and alloy to yield solid metal plate, billet, bar, cast part, or be further processed to powder. Although there is considerable installed capacity to produce titanium by the Kroll process, the manufacturing cost of the produced titanium is over $4.00/lb. New capacity via the Kroll process is quite capital intensive at well over $10/lb. Since the Kroll process has been in commercial production for over 70 years, it is unlikely capital or operating cost can be reduced to any major extent, thus lower cost titanium via the Kroll process has a low probability.

The energy to extract titanium from its ore is within about 10% that of aluminum from its oxide. Therefore, theoretically it should be possible to produce titanium for a cost near that of aluminum. Since aluminum is produced electrolytically, it should be possible to produce low cost titanium electrically. In fact Kroll predicted electrolysis would replace the metallothermic (magnesium) reduction to produce titanium. However, over the past 70 years there has been a plethora of investigations to produce titanium electrolytically. Primarily, the feed has been the titanium tetrachloride ($TiCl_4$), but $TiCl_4$ exhibits a covalent type bond and is not soluble in fused salts. Because of titanium's electronegativity it must be electrolyzed in a medium free of ionizable hydrogen which has lead to fused salt electrolytes. Titanium exhibits multiple valences which in electrolysis systems results in disproportionation leading to very poor coulombic or Faradic efficiencies. In our earlier U.S. published application Ser. No. 10/828,641, we describe an electrolytic process for producing titanium metal using titanium oxides as the feed. This electrolytic process reduces $TiO_2$ carbothermically to a lower oxide which in the presence of a carbon source as the anode discharges a low valence titanium ion to be electrowon at the cathode and giving CO and/or $CO_2$ at the anode according to the following reaction:

$$TiCO=Ti+CO \qquad (2)$$

While this process can produce titanium and at a projected cost of sales approximately $v_2$ that of the Kroll process, there is inclination or a familiarity for the traditional Kroll metallothermic process since it has been in use of over 50 years.

Trials have been made to operate the Kroll process continuously. See, for example, Tetsushi N. Deura, et. al., *Metallurgical and Materials Transactions B*, Vol. 29B, December 1998, pgs. 1167-1174; Ryosuke O, Suzuki, et. al., Ibid, Vol. 30B, June 1999, pgs. 403-410; and Akic Friwa and Satoru Takays, JOM, October 2005, pgs. 56-60. These prior art authors utilized a molten salt containing at least some magnesium chloride ($MgCl_2$) onto which magnesium metal was floated and $TiCl_4$ was introduced from the bottom instead of the typical Kroll process where the $TiCl_4$ is introduced from the top. The reaction is the same as the Kroll process (Reaction 1), the objective being to construct the process in such a way to permit continuous operation that eliminated the traditional batch Kroll process. However, there was no elimination of separately producing and handling the toxic, corrosive and moisture sensitive $TiCl_4$ nor elimination of a separate electrochemical plant to produce the magnesium reductant.

BRIEF DESCRIPTION OF THE INVENTION

The instant application provides a method for producing a metal M, or metal alloy $M_xN_y$, of interest, which comprises electrolyzing a molten salt electrolyte of an alkali-metal or alkaline-earth metal halide, AX or $AX_2$, with an anode formed of carbon or an inert material or of a composite of a metal oxide of the metal of interest and carbon, to discharge the alkali or alkaline-earth metal A, at the cathode, and to discharge nascent chlorine gas at the anode, whereby to produce a halide of the metal of interest, $MX_n$ and/or $NX_n$, and metallothermically reducing the metal halide $MX_n$ and/or $NX_n$ either separately or combined, with the alkali or alkaline-earth metal A, obtained cathodically to produce the metal M, or metal alloy $M_xN_y$, of interest in particulate form.

BRIEF DESCRIPTION OF THE DRAWINGS

Further features and advantages of the present invention will be seen from the following detailed description taken in conjunction with the following drawings, wherein like numerals depict like parts, and wherein.

DETAILED DESCRIPTION OF THE INVENTION

Figure 1:
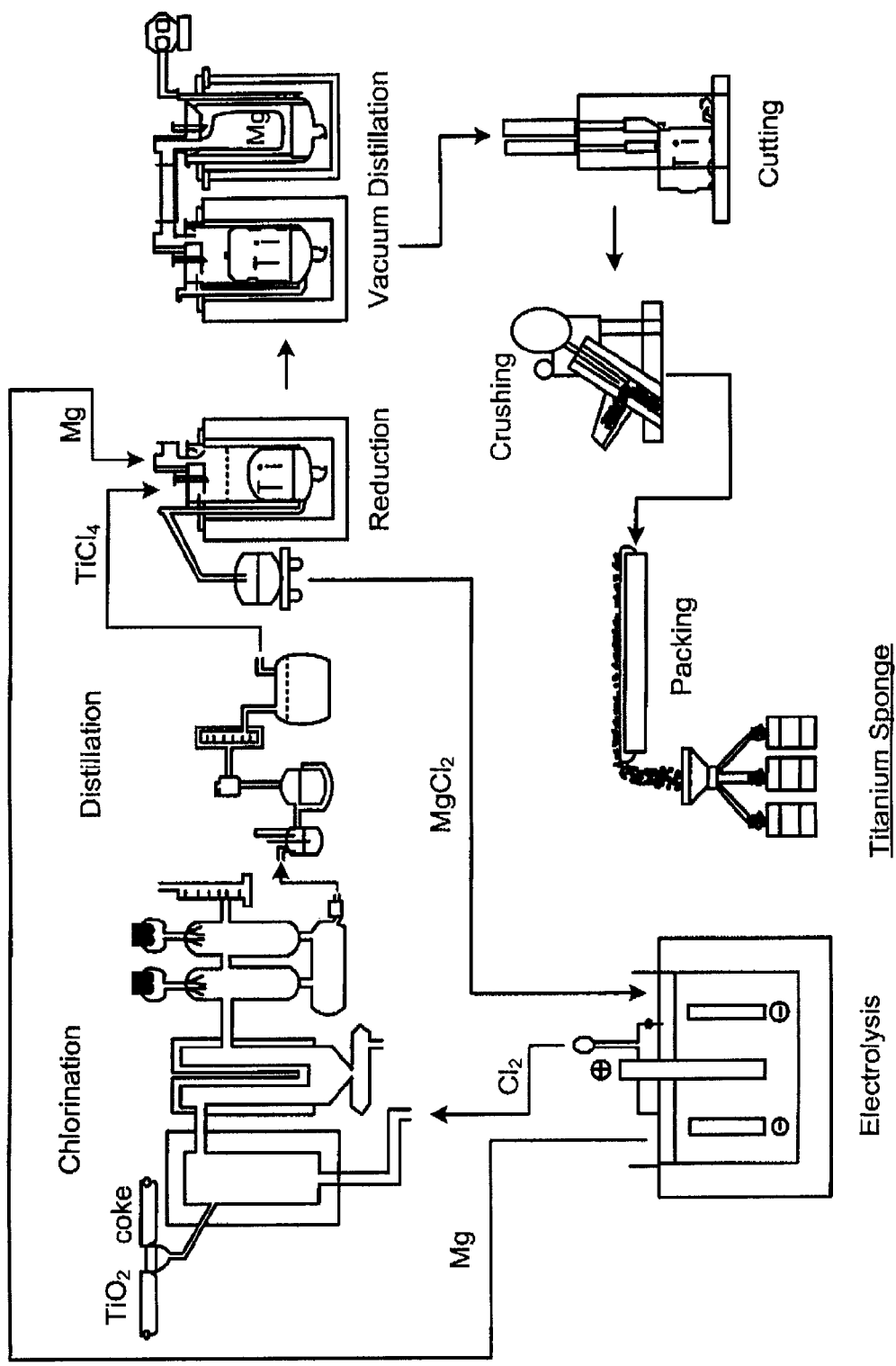
FIG. 1 is a schematic diagram illustrating the prior art Kroll process.

The instant invention comprises utilizing a composite anode containing an oxide of the metal of interest, e.g., titanium and carbon in the atomically bound or unbound state which is electrolyzed in a fused salt containing at least sufficient magnesium chloride ($MgCl_2$) or another alkaline or alkaline earth metal salt, e.g., NaCl, LiCl, KCl, NaF, LiF, KF or $MgF_2$, $CaCl_2$, $CaF_2$ to electrodeposit magnesium at the cathode and the released chloride at the anode reacts with the titanium oxide and carbon composite anode to produce a titanium chloride with a carbon oxide gas given off at the anode. A reaction mechanism that can explain the instant invention is as follows:

Cathode (+):

$$2Mg^{2+}+4e^-=2Mg(s) \quad (3)$$

$$TiCl_4(g)+2Mg(s)=Ti(s)+MgCl_2(l) \quad (4)$$

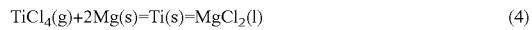

Anode (−):

$$4Cl^-=2Cl_2(g)+4e^- \quad (5)$$

$$TiOC(s)+2Cl_2(g)=TiCl_4(g)+CO \quad (6)$$

The equations are not balanced as the anode can contain $TiO_2$, TiO, $Ti_2O_3$, and/or a series of oxides with solid solution of $TiO_x$—$C_{1-x}$ and the carbon depending upon the anode fabrication processing including the carbothermic reduction processing conditions of the $TiO_2$ and carbon feed and the titanium chloride ($TiCl_x$) produced at the anode can involve x=2, 3, or 4. However, during carbo-chlorination, because of the powerful oxidizing properties of chlorine, only $TiCl_4$ is produced. In addition, $TiCl_3$ is a solid that sublimes at 450° C., and $TiCl_2$ melts at 1100° C. which prevents them from escaping the anode compartment as a gas. The metallothermic reduction of the titanium chloride proceeds in-situ either from a magnesium ion or magnesium metal. The titanium chloride produced depends on the kinetics of the anode reaction of the chloride ion released at the anode reacting directly with the TiO/C or forming the gas $Cl_2$ which then reacts with the TiO/C to form $TiCl_x$ with x=2, 3, or 4. The important point is that the electrolysis potential is sufficiently high that magnesium is electrolytically deposited at the cathode and a chlorine species is produced at the anode that reacts with the TiO/C anode composition to produce a titanium chloride which is reduced by the deposited magnesium to produce titanium, and $MgCl_2$ being reformed to complete the cycle for regeneration of magnesium electrolytically and release of chloride in the electrolysis. The reaction sequence is continuous and can produce titanium powder with a continuous feed of a TiO/C anode. The titanium powder settles in the salt and is continuously removed through siphoning, pumping through a filter or cyclone or other similar processes. Titanium powder is produced via this reaction scheme in contrast to sponge by the traditional Kroll process providing direct use of the powder to make parts using standard powder metallurgy techniques. With a composite anode consisting of $TiO_xC_{1-x}$ under electrolysis it is possible to electrowin titanium by discharging a titanium ion from the anode and depositing it at the cathode at a potential less than that to deposit magnesium and discharge chlorine at the anode. However, the activity of titanium ions in the fused salt is considerably less than the activity of magnesium when $MgCl_2$ is used as a component in the fused salt. This higher activity of magnesium in the fused salt and a sufficient high potential will deposit magnesium and discharge chlorine to form a titanium chloride that is chemically reduced by the magnesium in preference to deposition of titanium from the composite anode.

The temperature of the reaction/electrolysis should be above the melting point of magnesium and typically will be in the range of 900° C. which is the typical temperature in the Kroll process where $TiCl_4$ is mixed with the molten magnesium. In the instant invention it is desirable the salt is covered with a layer of molten magnesium at electrolysis initiation to eliminate any discharge or release of $TiCl_x$ generated at the anode where the $TiCl_x$ would come in contact with the magnesium and be chemically reduced to Ti and form $MgCl_2$.

Figure 2:
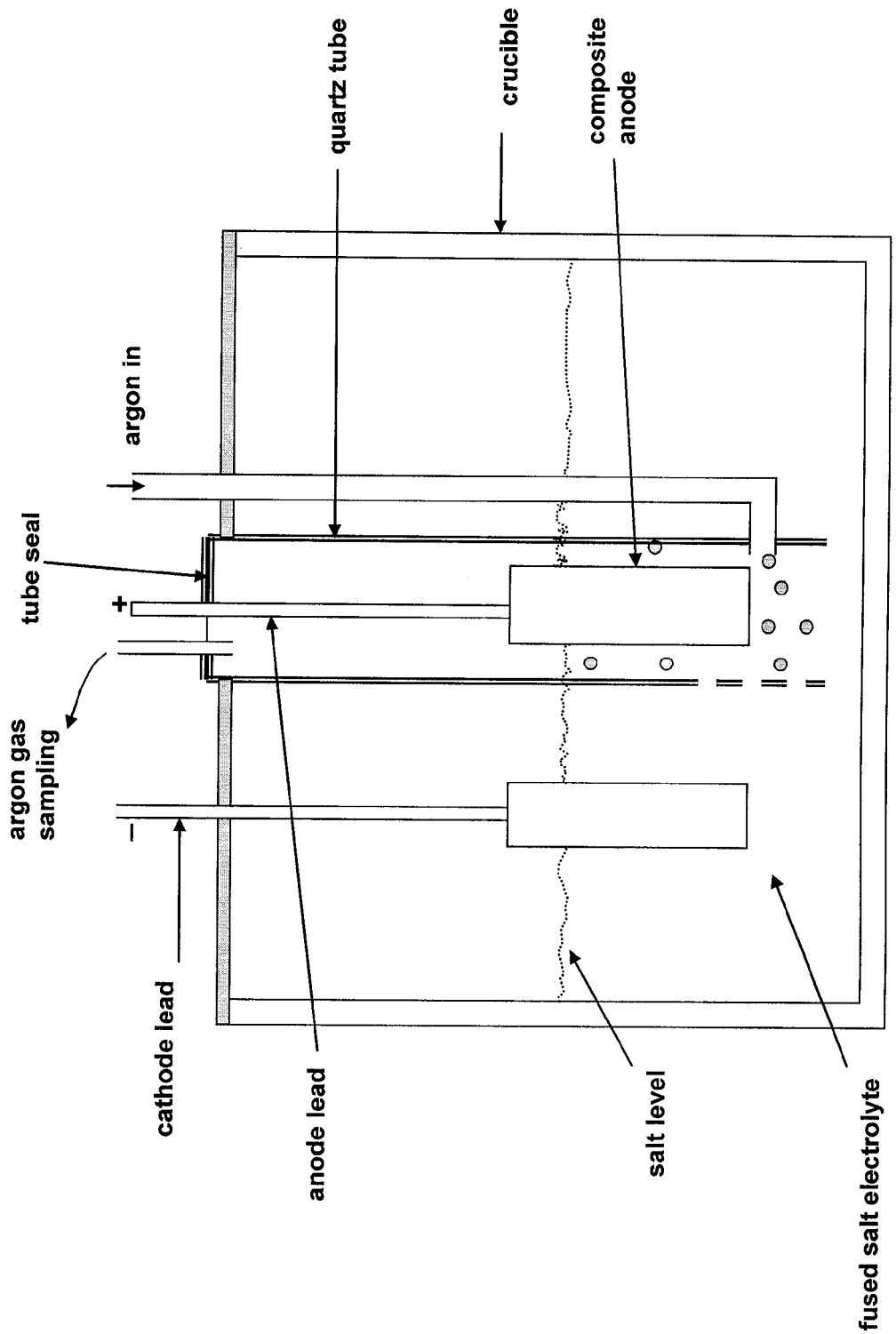
FIG. 2 is a cross-sectional view illustrating an electrochemical cell for practicing the present invention.

In order to establish the reactions of equations 3, 4, 5, and 6 were indeed occurring, an experimental setup was performed to isolate the composite anode and the cathode to determine if a $TiCl_x$ was being produced at the anode as well as CO being given off, and that magnesium was being deposited at the cathode. An experimental setup was made as illustrated in FIG. 2. The possible reactions from a TiO/C anode at approximately 1.64V to 1.8V produce titanium at the cathode and CO at the anode, depending on the temperature. The decomposition voltage for $MgCl_2$ to deposit Mg and $Cl^-$ at the anode is 2.50 V. The potential between a composite anode and a cathode should be in excess of 2.5 volts to assure deposition of Mg and release of $Cl^-$ at the anode. The voltage will of necessity be higher than 2.5 volts to overcome the resistance of the fused salt electrolyte between the anode and cathode, voltage drops in the anode and cathode leads and connections, and any overvoltages on the electrodes.

Figure 3:
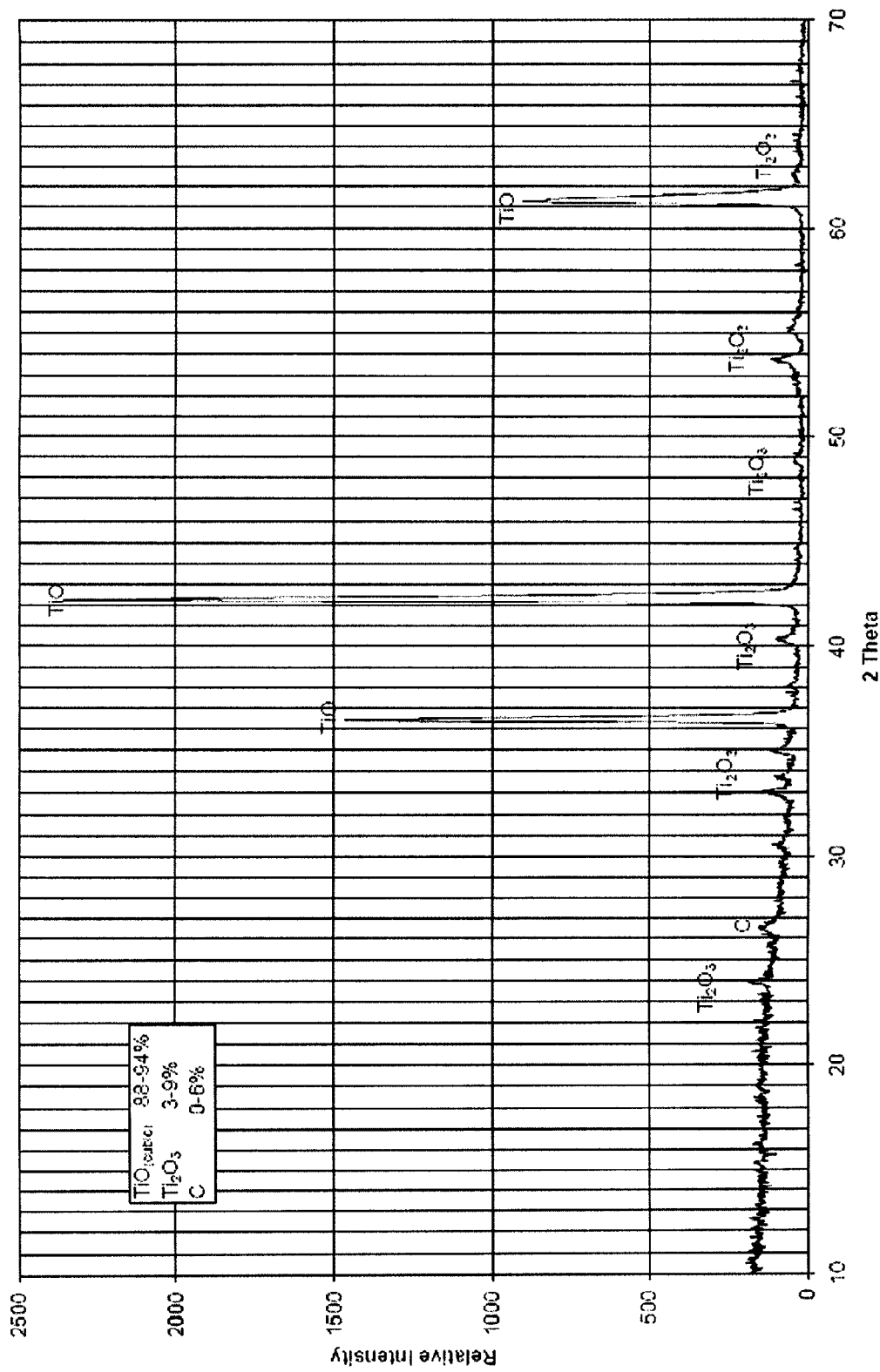
FIG. 3 is an x-ray diffraction pattern of carbothermally reduced $TiO_2$ which was combined with stoichiometric carbon to form a composite anode.

The salt composition chosen for the electrolysis trials in the experimental setup shown in FIG. 2 was 100% $MgCl_2$. The quartz tube around the anode with argon gas sweeping up the tube captured the gases being generated at the composite anode. The composite anode was produced by mixing one mole of carbon with one mole of $TiO_2$ and heating to 1800° C. in the absence of air. The analysis of the anode by x-ray diffraction (XRD) shown in FIG. 3 revealed a solid solution compound of $TiO_{0.6}C_{0.4}$ with an elemental oxygen content of 19% and carbon content of 7%. Additional carbon was added in the form of particles and carbon content from a resin binder to provide stoichiometric carbon with the oxygen and carbon stoichiometrically balanced even though some of the carbon is chemically bound to the titanium which can be represented as $Ti_2°C$. With electrolysis at a potential greater than 2.5V the analysis of the anode gases showed CO and $TiCl_4$. Around the cathode beads of magnesium metal were recovered. These separated electrode reactions demonstrated that magnesium chloride could be separated by electrolysis to produce magnesium at the cathode, and the reactions at the anode produced $TiCl_4$ and CO. This trial reaction was repeated with the same results and repeated again in a salt containing NaCl—KCl—$MgCl_2$. An anode of $TiO_2$—C heated only to 1100° C. to prevent carbothermic reduction was also utilized with electrolysis greater than 2.5V and the anode gases were $TiCl_4$ and CO. It is thus seen that a composite anode containing combinations of a titanium oxide and carbon can be used in a magnesium halide salt to produce titanium in a combined electrolysis-metallothermic process During the carbon-chlorination reaction because of the powerful oxidizing properties of chlorine only $TiCl_4$ is produced. There is no more electrical energy utilized in that two electrons are required to produce the magnesium for reducing the $TiCl_4$ as compared to two electrons required to directly produce titanium if the titanium ion is in a plus two state and there are no disproportionation reactions with the titanium. The electrolysis in-situ produces a $TiCl_4$ at the anode that is reduced by the magnesium which is a metallothermic reduction without the necessity of separately producing the toxic $TiCl_4$ and the associated problems of its transport, storage, etc., as well as the handling and transportation of magnesium and magnesium chloride to the magnesium electrolysis cell.

It is not necessary to produce a titanium suboxide-carbon electrode to be chlorinated with the $MgCl_2$ electrolysis. The chlorine release on the anode can produce a $TiCl_x$ compound with a $TiO_2$—C electrode or other reduced oxides of titanium such as $Ti_3O_5$, $Ti_2O_3$, etc. when stoichiometrically mixed with carbon and utilized as an anode. Also, it is not necessary that the anode be in one solid body for the discharged chlorine to react with the $TiO_x$—C to form $TiCl_4$. For example, a porous carbon container filled with $TiO_x$—C powder could be used and the chlorine discharged on the anode from $MgCl_2$ electrolysis will react with the $TiO_x$—C powder to produce $TiCl_4$. This provides great flexibility to form an anode containing $TiO_2$ and carbon to be chlorinated with chlorine discharge from $MgCl_2$ electrolysis.

Magnesium is provided as the primary example for reducing in-situ generated $TiCl_4$ from a composite of Ti—O—C at the anode. The $TiCl_4$ is reduced by any magnesium ions and/or magnesium metal soluble in the fused salt electrolyte as well as metal generated at the cathode and is built-up on the fused salt surface due to magnesium's lower density than the fused salt. The solubility of magnesium in $MgCl_2$ and other halide fused salts in the operating temperature range of 750-1000° C. is reported in the literature to be in the range of 0.19 to 0.9 mole percent.

Other metals may be used as the reductant provided they have a higher free energy of formation of its oxide and chloride compared to titanium chloride and oxide. For example, in the case of calcium, its solubility in its chloride or fluoride is higher than many of the other possible reductant metals. The solubility of calcium ions and/or metal in calcium chloride in the temperature range of approximately 800-1000° C. is approximately up to 4 mole %. This higher solubility of calcium in its fused halide provides a more efficient reduction of $TiCl_4$ whether $TiCl_x$ is soluble in the $CaCl_2$ or is a gas, or $TiCl_4$ passing upto calcium metal floating on the surface of the $CaCl_2$.

To avoid any possibility of titanium being deposited from a composite Ti—O—C anode in competition with calcium being deposited from its chloride which theoretical decomposition voltage is 3.01V and chlorine being discharged on the anode to make $TiCl_x$ for reduction by the deposited/soluble calcium, the Ti—O—C composition can be raised to just above the fused salt level and the discharged chlorine will pass up through the Ti—O—C to produce $TiCl_4$. The anode within the fused salt for chlorine evaluation can be graphite or any electroconductor that will not become anodic soluble in the fused salt and/or react with the discharged chlorine. The composition of the Ti—O—C that is contained above the salt level to react with the discharged chlorine from the electrolysis of $CaCl_2$ can be $TiO_2$—C, $Ti_3O_5$—C, $Ti_2O_3$—C, TiO-C, $Ti_2$° C., TiOC in ratios of titanium oxide to carbon to provide $TiCl_4$ and $CO/CO_2$. The lower oxides are highly exothermic to produce $TiCl_4$ at low temperatures while $TiO_2$—C becomes endothermic at higher temperatures.

It is known that cathodically deposited calcium due to its high solubility in $CaCl_2$ can back react with the chlorine generated at the anode to reduce Columbic efficiency. However, with the $TiCl_4$ being returned to the $CaCl_2$ salt which reacts with the soluble calcium, potential back reaction with anode chlorine is reduced. Using a baffle to direct the chlorine upward and away from the anode into the Ti—O—C containment to make $TiCl_4$ also reduces the probability of the soluble calcium from back reacting with any chlorine.

To produce titanium alloy powder, other chlorides of alloying elements were blended with the returning $TiCl_4$ which become reduced with the $TiCl_4$ to generate an alloy composition in each particle. An example is blending aluminum trichloride, vanadium trichloride and boron trichloride that produced an alloy of Ti—Al—V—B. The relative amounts of each chloride determine the composition of the alloy for example Ti-6Al-4V-0.5B. Some of the halides are miscible with liquid $TiCl_4$ and can be mixed before the liquid $TiCl_4$ is returned to the $CaCl_2$ salt. Other alloying elements, e.g., metal halides of Cu, Be, Mg, Al, B, Sc, Y, La, Si, Sn, Zr, Hf, V, Nb, Ta, Cr, Mo, W, Fe and Mn may be blended in the $TiCl_4$ return stream to be co-reduced by the calcium to produce uniformly alloyed powders.

Figure 4:
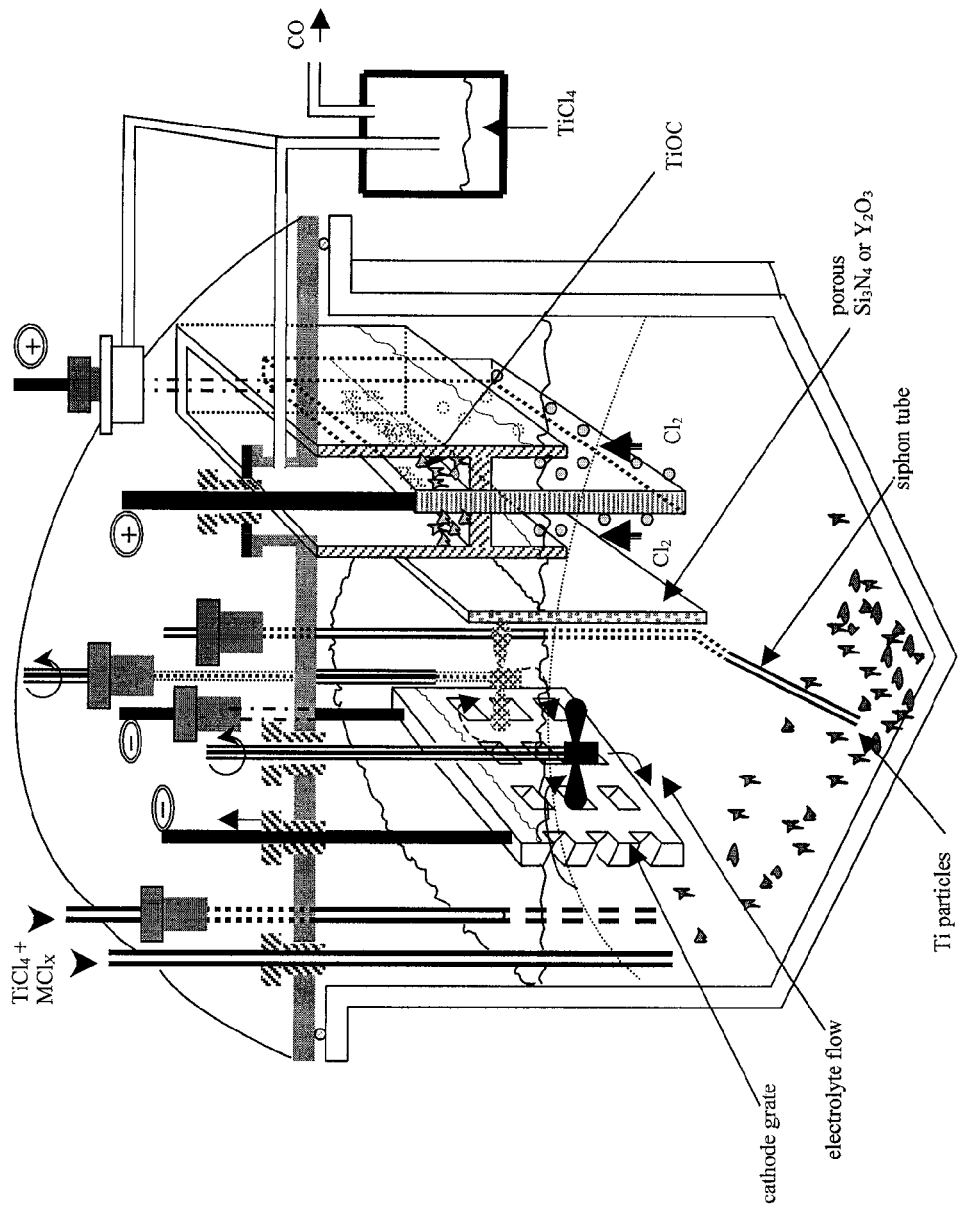
FIGS. 4-6 are views similar to FIG. 2 of other electrochemical cells for practicing the present invention.

In addition to utilizing a $CaCl_2$ fused salt electrolyte wherein the Ca has high solubility, an electrolyte of potassium chloride (KCl) can be used as potassium (K) metal has an even higher solubility in KCl such as approximately 10 mole %. This higher solubility of K in KCl provides excellent reduction of $TiCl_4$ and/or other metal chlorides to produce the other metal or alloy with titanium. For example, if the chlorides of aluminum, vanadium and boron are blended with $TiCl_4$ the K solubility in the KCl will concurrently reduce the chloride mix to produce an alloy particle. The potassium is produced via electrolyzing the molten KCl that produces potassium on the cathode and chlorine on the anode to react with a titanium oxide carbon combination such as illustrated in FIG. 4. Of course, excess K over its solubility in KCl can also be utilized in which case the excess K will float on the surface of the KCl.

The separation of the salt electrolyte from the produced titanium, titanium alloy or other metal particles must be performed so as not to contaminate the metal particles and particularly with oxides or other interstitials. Water and/or acid washing of small titanium based particles can result in excessive passivation oxygen and nitrogen pick-up. One useful technique to separate the salt electrolyte from the metal particles is vacuum evaporation. The temperature to evaporate the salt electrolyte, depending on temperature, can cause sintering to begin between metal particles which destroys the metal particle flowability. It has been found that a salt mixture of potassium chloride and lithium fluoride can be vacuum evaporated at temperatures lower than predicted by the vapor pressure temperature curve of either salt independently. There is an apparent azeotrope that permits low temperature vacuum evaporation of a KCl—LiCl salt mixture that provides ready separation of such a salt electrolyte from produced metal particles.

Also, various other eutectic salt mixtures may be used, including but not limited to lithium fluoride, sodium fluoride and potassium fluoride, sodium fluoride and lithium fluoride, sodium chloride, calcium chloride and potassium chloride, sodium chloride, magnesium chloride and sodium fluoride, and sodium chloride, potassium chloride and sodium fluoride.

The process to produce metal and alloy particles can be thought of as a combined electrochemical and chemical reduction process. The electrochemical portion is to produce an alkali, alkaline earth or combination from their halide salts producing the metal at the cathode and chlorine at the anode. The metal at the cathode may be soluble to some extent in the molten halide salt or may build up onto the salt surface. The chlorine produced at the anode is passed over a titanium oxide-carbon mixture to form $TiCl_4$ which is recycled into the molten electrolyte to be chemically reduced by the alkali metal, alkaline earth metal or an alloy thereof which may be soluble in the molten salt electrolyte and/or reside on the surface of the fused salt electrolyte.

In one variation, the alloying element oxide may be mixed with the titanium oxide/suboxide or independently mixed with stoichiometric carbon to in-situ form the chloride of the alloying element as the anode discharged chlorine passes over the oxide carbon mixture. As shown in FIG. 4, the alloying element chloride may be added from an independent source. It is also possible to add $TiCl_4$ from an independent source and not from in-situ as shown in FIG. 4.

The described processing can produce alloy particles with as many alloying elements as are added to the incoming stream to be reduced by the alkali or alkaline earth metals. The relative concentration of the alloying elements in the alloy particle is controlled by the ratio in the feed that is discharged into the halide salt containing the soluble reducing metal and/or the reducing metal floating on the surface of the molten salt.

The overall reaction in the case of calcium is as shown in reaction (7). If potassium is the reducing metal, the same reaction occurs accounting for the different valence and electron transfer.

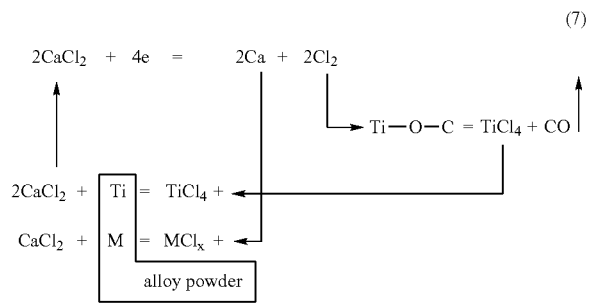

(7)

Figure 5:
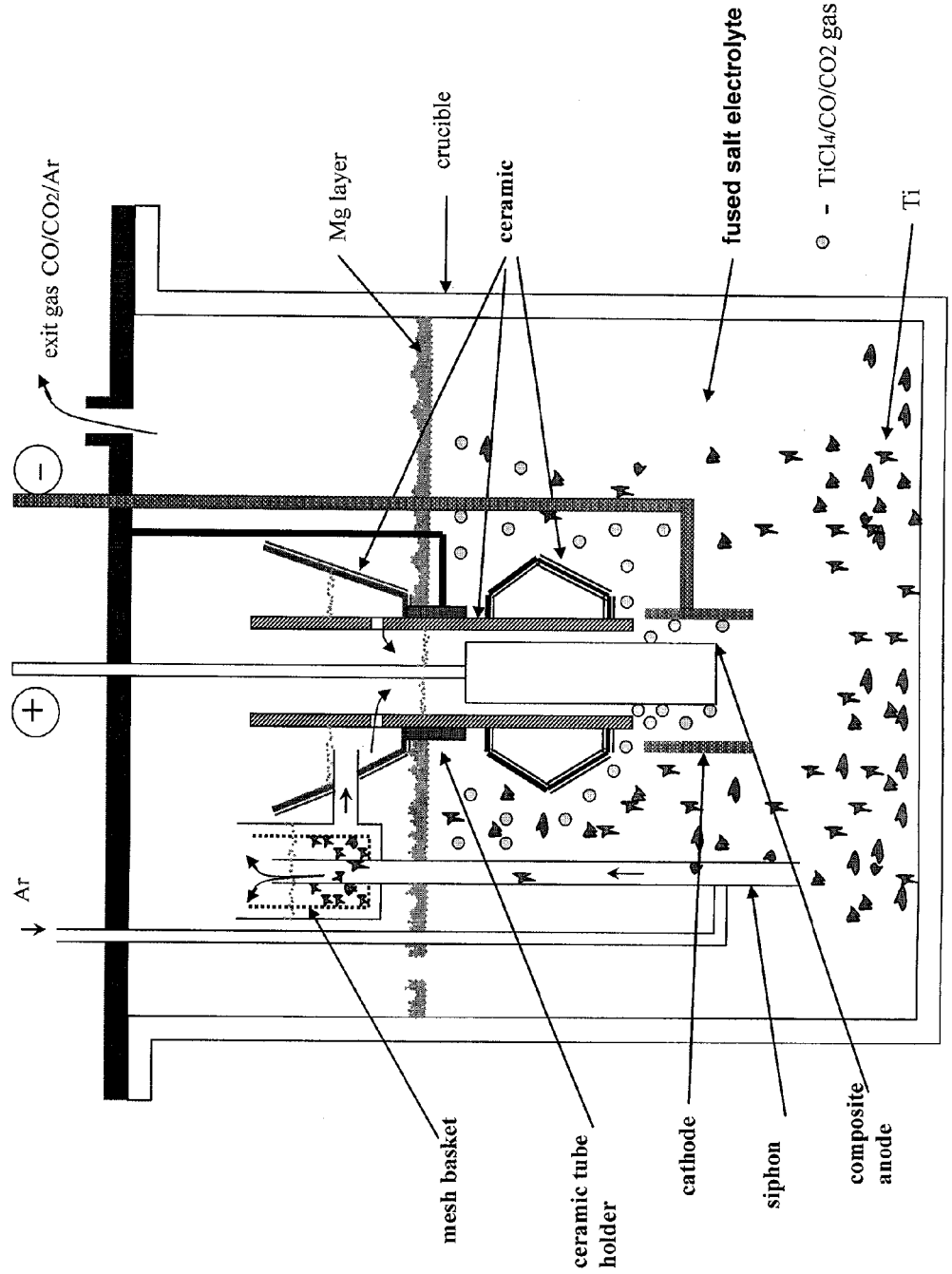

To further demonstrate that utilizing a composite anode electrolyzed above the decomposition potential of magnesium chloride in a fused salt electrolyte can produce titanium particles, an experimental trial was performed in the system shown in FIG. 5. To prevent any $TiCl_4$ produced at the anode from rising up the anode surface and not contacting either magnesium metal ion or the agglomerated magnesium metal the system gas pumped the electrolyte down the anode surface between the composite anode and ceramic tube to force the generated gases to pass outward and upward to contact the $Mg^{2+}$ ions and/or agglomerated magnesium metal generated at the cathode. The deposited magnesium metal rises to the surface of the salt and the $TiCl_4$ reacts to provide titanium metal particles by the reaction:

$$TiCl_4 + Mg = Ti + MgCl_2 \quad (8)$$

The equation is not balanced since the value of X in the TiCl compound produced at the anode can be 2, 3 or 4. If the anode is continuously fed and the Ti particles are removed periodically or continuously, the process is continuous as contrasted to the Kroll process which is batch.

It is possible to form an alloy of titanium by utilizing a composite anode containing the alloying elements as the oxide and/or oxycarbide. For example, to produce the common alloy Ti-6Al-4V the composite anode can contain $VCl_4$ and $VOCl_3$. When chlorine is released at the anode not only will $TiCl_4$ be produced but $AlCl_3$ and $VCl_3$ in the proportion they are contained in the anode with $TiO_xC_{1-x}$—C. The electrolytically produced Mg will not only reduce the $TiCl_4$ but also the $VCl_4$ and $VOCl_3$, that is:

$$1.5Mg + VCl_3 = V + 1.5MgCl_2 \quad (9)$$

$$1.5Mg + VOCl_3 = V + 1.5MgCl_2 + O_2 \quad (10)$$

With an intimate mix of the alloying compounds in the composite anode the formation of the metal chlorides and their reduction will produce titanium particles containing the desired ratio of Ti, Al and V that forms the alloy Ti-6Al-4V. Of course other alloying elements can be contained in the anode to produce their chloride when chlorine is released at the anode with reduction from the Mg to produce titanium alloys in particulate form.

Also, other metals such as lithium, sodium, potassium and calcium can be used instead of magnesium as the metal that is electrolyzed from its chloride and reduces the $TiCl_4$ produced at the anode.

The instant invention of in-situ producing titanium via electrolysis of magnesium chloride that in-situ produces $TiCl_4$ with the magnesium reducing the $TiCl_4$ in a cyclic continuous systems is estimated to have a cost of half that of the standard Kroll process.

Figure 6:
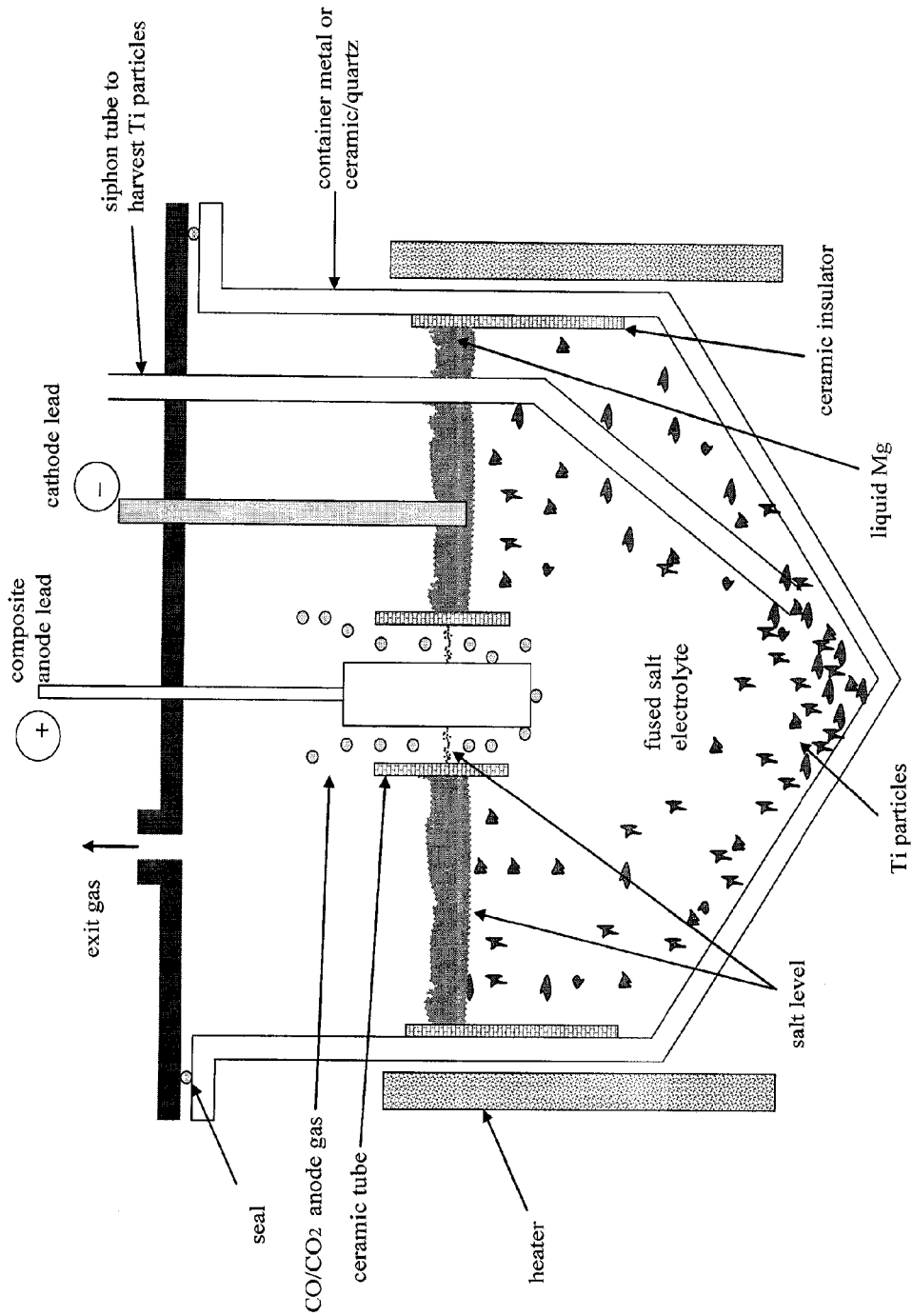

It is also possible to operate the system maintaining the potential below that to deposit magnesium. As taught in U.S. Ser. No. 10/828,641, the contents of which are incorporated herein by reference, the composite anode can be utilized to electrowin titanium at a cathode. The cathode is typically a solid metallic surface which also accommodates pumping the electrolyte over the cathode to achieve a high mass flow. An alternate configuration is to utilize a liquid cathode that can result in producing a higher purity titanium. Many have tried liquid metal cathodes such as Zn, Al, In, Pb, etc., but titanium forms compounds with these liquid metals, making separation of pure titanium very difficult. It is known that magnesium does not form undesirable products with titanium as confirmed by the Kroll process where molten magnesium reduces $TiCl_4$ and the produced titanium does not react with the molten magnesium. However, because of magnesium's very low density it floats on the usual fused salt compositions. A cell arrangement which utilizes molten magnesium as the cathode and separates the anode gases of $CO/CO2$ is illustrated in FIG. 6. Other compatible liquid metals also can serve as the cathode such as lithium, sodium, potassium, and calcium.

Under an electrolytic applied potential titanium ions from the anode go into solution and are deposited at the liquid metal cathode-salt interface. The anode gas of $CO/CO_2$ exits up the anode without interacting with the depositing titanium, which eliminates any possible back reactions with the deposited titanium particles. The formed titanium particles at the liquid metal cathode surface are heavier than the liquid salt electrolyte and thus settle to the bottom of the cell. Collection can be in a filter basket which is periodically removed or siphoned out with a pump or gas lift, or using a hydrocyclone. A continuous anode feed can be used to provide a continuous operation to produce titanium particles.

The invention will be further described illustrated by the following non-limiting example.

EXAMPLE

Calcium chloride was melted in a closed container in the absence of air just under vacuum less than 10 μm Hg to remove moisture then solidified and remelted under a flow of purified Argon gas. At a temperature of 850° C. a graphite anode and cathode was immersed in the salt with electrolysis at 2.8 volts to purify the salt from oxides and other impurities without decomposing the calcium chloride.

An anode of graphite with a mixture of TiOC suspended in a porous carbon container surrounding the graphite anode above the molten salt level was installed in the cell. A cathode of titanium was utilized. Electrolysis was performed with a voltage above the decomposition voltage of calcium chloride (3.3 V plus the cell resistance and overvoltages) to deposit calcium at the cathode. A porous barrier of carbon was utilized around the anode to prevent back reaction of cathode produced calcium and chlorine at the anode. The porous carbon barrier had sufficient surface are to avoid becoming bipolar.

The chlorine liberated at the anode reacted with the TiOC which had been produced by carbothermic reduction of $TiO_2$ and carbon. Titanium tetrachloride was produced from the reaction of TiOC and chlorine along with a minor positive test for phosgene. The titanium tetrachloride was recycled to bubble into the cathode area for reduction by the cathodically produced calcium. Into the $TiCl_4$ stream the additional metal chlorides of aluminum, iron, tin and boron were added.

The calcium produced at the cathode which is soluble in the $CaCl_2$ at approximately 3-4 mole percent or excess calcium that floats on the surface of the $CaCl_2$ reduces the combined metal chlorides to produce titanium alloy particles. The alloy produced in this case consisted of Ti-4.5Al-0.7Sn-2.5Fe-0.7B.

Any number of metal chlorides can be added to the $TiCl_4$ to produce virtually any alloy desired including alloys that cannot be produced by the traditional method of adding alloying elements to molten titanium. Also, the $TiCl_4$ does not necessarily have to be produced in-situ at the anode and can be produced by conventional carbo-chlorination. It also is possible to prevent any phosgene escape in the chlorination of TiOC with a sufficiently high bed of TiOC wherein any produced phosgene will fully react with the TiOC to produce $TiCl_4$.

While the invention has been described in connection with the production of titanium, other high value metals of interest such as chromium, hafnium, molybdenum, niobium, tantalum, tungsten, vanadium and zirconium may be produced with an anode formed of oxide-carbon composite of the metal of interest.

Yet other changes may be made without departing from the spirit and scope of the invention.

What is claimed is:

1. A method for producing a metal M or metal alloy $M_xN_y$, of interest, which comprises:
    providing an electrolysis cell having a molten salt electrolyte of an alkali-metal or alkaline-earth metal halide AX or $AX_2$, heated to a temperature above 650° C., an anode formed of carbon or an inert material or of a composite of a metal oxide of the metal of interest and carbon, and a cathode;
    flowing the electrolyte over the surface of the cathode and the anode and electrolyzing the molten salt electrolyte in the electrolysis cell to discharge the alkali or alkaline-earth metal A, at the cathode, and to discharge nascent chlorine gas at the anode;
    reacting the nascent chlorine gas with a source compound of the metal of interest (M and/or N) at or near the anode, whereby to produce a halide of the metal of interest $MX_n$ and/or $NX_n$ in the electrolysis cell;
    metallothermically reducing the metal halide $MX_n$ and/or $NX_n$ either separately or combined, with the alkali or alkaline-earth metal A, obtained cathodically to produce the metal M, or metal alloy $M_xN_y$ of interest, in particulate form; and
    continuously harvesting particles of the metal M, or metal alloy $M_xN_y$ of interest by siphoning, through a filter basket, using a hydrocyclone or a pump.

2. The method according to claim 1, wherein the metal or metal alloy of interest is produced as a powder.

3. The method of claim 1, wherein the anode is formed of a titanium oxide or titanium suboxide-carbon composite, and the metal produced comprises titanium.

4. The method of claim 1, wherein the anode is formed of a chromium oxide-carbon composite, and the metal produced comprises chromium.

5. The method of claim 1, wherein the anode is formed of a hafnium oxide-carbon composite, and the metal produced comprises hafnium.

6. The method of claim 1, wherein the anode is formed of a molybdenum oxide-carbon composite, and the metal produced comprises molybdenum.

7. The method of claim 1, wherein the anode is formed of a niobium oxide-carbon composite, and the metal produced comprises niobium.

8. The method of claim 1, wherein the anode is formed of a tantalum oxide-carbon composite, and the metal produced comprises tantalum.

9. The method of claim 1, wherein the anode is formed of a tungsten oxide-carbon composite, and the metal produced comprises tungsten.

10. The method of claim 1, wherein the anode is formed of a vanadium oxide-carbon composite, and the metal produced comprises vanadium.

11. The method of claim 1, wherein the anode is formed of zirconium oxide-carbon composite, and the metal produced comprises zirconium.

12. The method of claim 1, wherein the molten salt electrolyte comprises an alkali-metal chloride selected from the group consisting of lithium chloride, sodium chloride and potassium chloride.

13. The method of claim 1, wherein the molten salt electrolyte comprises an alkali-metal fluoride selected from the group consisting of lithium fluoride, sodium fluoride and potassium fluoride.

14. The method of claim 1, wherein the molten salt electrolyte comprises an alkaline-earth metal chloride selected from the group consisting of magnesium chloride and calcium chloride.

15. The method of claim 1, wherein the molten salt electrolyte comprises an alkaline-earth metal fluoride selected from the group consisting of magnesium fluoride and calcium fluoride with calcium chloride.

16. The method of claim 1, wherein the molten salt electrolyte comprises a binary mixture of alkali-metal chlorides selected from the group consisting of lithium chloride-potassium chloride, lithium chloride-sodium chloride, and sodium chloride-potassium chloride, or a ternary mixture of sodium chloride, lithium chloride and potassium chloride.

17. The method of claim 1, wherein the molten salt electrolyte comprises a binary mixture consisting of calcium chloride and magnesium chloride.

18. The method of claim 1, wherein the molten salt electrolyte comprises an eutectic mixture of alkali-metal halides selected from the group consisting of lithium fluoride, sodium fluoride and potassium fluoride, sodium fluoride and lithium fluoride, sodium chloride, calcium chloride and potassium chloride, sodium chloride, magnesium chloride and sodium fluoride, and sodium chloride, potassium chloride and sodium fluoride.

19. The method of claim 1, wherein the alkaline earth metal comprises magnesium.

20. The method of claim 1, wherein the alkaline earth metal comprises calcium.

21. The method of claim 1, wherein the alkali metal comprises lithium.

22. The method of claim 1, wherein the alkali metal comprises sodium.

23. The method of claim 1, wherein the alkali metal comprises potassium.

24. The method of claim 1, wherein the anode is formed of graphite.

25. The method of claim 1, wherein the anode is formed of a composite of an oxide of the metal of interest and carbon.

26. The method of claim 1, wherein the nascent chlorine discharged at the carbon anode is reacted with a composite of an oxide of the metal of interest and carbon to produce a halide of the metal of interest.

27. The method of claim 1, wherein the nascent chlorine discharged at the anode is reacted with a composite of an oxide of the metal of interest and carbon to produce a halide of the metal of interest.

28. The method of claim 1, wherein the metal particles are harvested by siphoning.

29. The method of claim 1, wherein the metal particles are harvested on a filter basket.

30. The method of claim 1, wherein the metal particles are harvested using a hydrocyclone.

31. The method of claim 25, including the step of adding metal halides other than that of the metal of interest wherein a metal alloy is produced.

32. The method of claim 31, wherein the metal halide added is a halide of an element selected from the group consisting of Cu, Be, Mg, Al, B, Sc, Y, La, Si, Sn, Zr, Hf, V, Nb, Ta, Cr, Mo, W, Fe and Mn.

33. The method of claim 25, wherein the metal of interest is titanium.

34. The method of claim 25, wherein the metal oxide comprises an oxide of an element selected from the group consisting of Cu, Be, Mg, Al, B, Sc, Y, La, Si, Sn, Ti, Zr, Hf, V, Nb, Ta, Cr, Mo, W, Fe, and Mn.

35. The method of claim 31, wherein a titanium metal alloy is produced which comprises titanium alloyed with an element selected from the group consisting of Cu, Be, Mg, Al, B, Sc, Y, La, Si, Sn, Zr, Hf, V, Nb, Ta, Cr, Mo, W, Fe, and Mn, and a mixture of one or more of said elements.

36. The method of claim 31, wherein the metal alloy produced has the formula Ti-6Al-4V.

37. The method of claim 25, including the step of adding metal halides of metals other than those of the metal of interest wherein a metal alloy is produced.

* * * * *